US010516673B2

(12) United States Patent
Yuan

(10) Patent No.: US 10,516,673 B2
(45) Date of Patent: Dec. 24, 2019

(54) USER IDENTIFICATION MARKING METHOD, APPARATUS, AND SYSTEM

(71) Applicant: TENCENT TECHNOLOGY (SHENZHEN) COMPANY LIMITED, Shenzhen (CN)

(72) Inventor: Cancai Yuan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 220 days.

(21) Appl. No.: 15/621,061

(22) Filed: Jun. 13, 2017

(65) Prior Publication Data

US 2017/0279811 A1 Sep. 28, 2017

Related U.S. Application Data

(63) Continuation of application No. PCT/CN2016/077720, filed on Mar. 29, 2016.

(30) Foreign Application Priority Data

May 18, 2015 (CN) .......................... 2015 1 0250583

(51) Int. Cl.
*H04L 29/06* (2006.01)
*H04W 12/12* (2009.01)
(Continued)

(52) U.S. Cl.
CPC ............ *H04L 63/104* (2013.01); *G06F 21/31* (2013.01); *G06F 21/45* (2013.01);
(Continued)

(58) Field of Classification Search
CPC ... H04L 63/104; H04L 63/1425; H04L 63/08; H04L 63/105; G06F 21/45; G06F 21/31; H04W 12/12; H04W 12/08
See application file for complete search history.

(56) References Cited

U.S. PATENT DOCUMENTS

2006/0288407 A1* 12/2006 Naslund ................ H04L 9/0844 726/9
2012/0324568 A1* 12/2012 Wyatt ..................... G06F 21/51 726/13
(Continued)

FOREIGN PATENT DOCUMENTS

CN 101827367 A 9/2010
CN 102547712 A 7/2012
(Continued)

OTHER PUBLICATIONS

The World Intellectual Property Organization (WIPO) International Search Report for PCT/CN2016/077720 dated Jun. 30, 2016 pp. 1-5.

*Primary Examiner* — Cheng-Feng Huang
(74) *Attorney, Agent, or Firm* — Anova Law Group, PLLC

(57) ABSTRACT

The present disclosure provides a user identification marking method. The method includes determining a user identification that needs a classification analysis; obtaining classification basis information of the user identification; analyzing the user identification according to the classification basis information, to obtain possible classifications of the user identification and a ranking thereof in each of the possible classifications; and providing the possible classifications and the rankings to a client.

14 Claims, 7 Drawing Sheets

(51) Int. Cl.
*G06F 21/31* (2013.01)
*G06F 21/45* (2013.01)
*H04W 12/08* (2009.01)

(52) U.S. Cl.
CPC ......... *H04L 63/1425* (2013.01); *H04W 12/12* (2013.01); *H04L 63/08* (2013.01); *H04L 63/105* (2013.01); *H04W 12/08* (2013.01)

(56) References Cited

U.S. PATENT DOCUMENTS

2013/0254831 A1* 9/2013 Roach ................... H04L 63/107 726/1
2014/0051432 A1* 2/2014 Gupta ..................... G06F 21/57 455/425
2014/0053261 A1* 2/2014 Gupta ..................... G06F 21/55 726/22
2014/0199664 A1* 7/2014 Sadeh-Koniecpol .... G09B 5/00 434/118
2014/0337862 A1* 11/2014 Valencia ................... G06F 8/71 719/313
2015/0101048 A1* 4/2015 Sridhara ................. G06F 21/55 726/23
2015/0121522 A1* 4/2015 Guido ................... H04L 63/145 726/23
2015/0140977 A1* 5/2015 Zhang ............... H04M 3/42059 455/415
2015/0288791 A1* 10/2015 Weiss .................... H04M 1/663 379/189

FOREIGN PATENT DOCUMENTS

CN 102769696 A 11/2012
CN 103905482 A 7/2014
CN 104253908 A 12/2014
JP 2007096941 A 4/2007

* cited by examiner

USER IDENTIFICATION MARKING METHOD, APPARATUS, AND SYSTEM

This application claims priority to PCT Application No. PCT/CN2016/077720, filed on Mar. 29, 2016, which claims priority of Chinese Patent Application No. 2015102505838, filed with the Chinese Patent Office on May 18, 2015 and entitled "USER IDENTIFICATION MARKING METHOD, APPARATUS, AND SYSTEM", which are incorporated herein by reference in their entirety.

FIELD OF THE TECHNOLOGY

The present disclosure relates to the field of communications technologies, and specifically to a user identification marking method, apparatus and system.

BACKGROUND OF THE DISCLOSURE

A user identification, for example, a phone number, or an email account, symbolizes a user identity, and is an important certificate for identifying the user identity. In many existing applications, for example, in a technology used for identifying a nuisance call, a user identity usually needs to be classified based on the user identification. However, in a specific classification, an especially important step is to mark the user identification.

In the existing technology, a user identification is generally marked by a user. For example, if the user thinks that a phone number is a fraud call, the user may mark the fraud call as a "fraud call", and submits the marking to a server for record.

However, a user often feels confused about how to perform classifications and markings, and cannot accurately mark a user identification. Consequently, the marking rate is relatively low, and the accuracy rate of marking is low.

SUMMARY

Embodiments of the present disclosure provide a user identification marking method, apparatus, and system, to increase a marking rate, and increase an accuracy rate of marking.

An embodiment of the present disclosure provides a user identification marking method, including: determining a user identification that needs a classification analysis; obtaining classification basis information of the user identification, the classification basis information including a marking historical record, a quantity of incoming and outgoing calls, incoming and outgoing call time periods, and/or regional distribution of users; analyzing the user identification according to the classification basis information, to obtain possible classifications of the user identification and a ranking thereof in each of the possible classifications; and providing the possible classifications and the rankings to a client.

An embodiment of the present disclosure further provides a user identification marking method, including: sending a query request to a server, the query request carrying a user identification that needs a classification query; receiving possible classifications of the user identification and a ranking thereof in each of the possible classifications that are returned by the server according to the query request, the possible classifications and the rankings being obtained by the server by analyzing the user identification according to classification basis information, and the classification basis information including a marking historical record, a quantity of incoming and outgoing calls, incoming and outgoing call time periods, and/or regional distribution of users; and marking the user identification according to the possible classifications and the rankings.

An embodiment of the present disclosure provides computer storage medium, the computer storage medium storing a processor executable instruction, the processor executable instruction being executed by a processor for performing the following operations: determining a user identification that needs a classification analysis; obtaining classification basis information of the user identification, the classification basis information including a marking historical record, a quantity of incoming and outgoing calls, incoming and outgoing call time periods, and/or regional distribution of users; analyzing the user identification according to the classification basis information, to obtain possible classifications of the user identification and a ranking thereof in each of the possible classifications; and providing the possible classifications and the rankings to a client.

An embodiment of the present disclosure further provides a computer storage medium, the computer storage medium storing a processor executable instruction, the processor executable instruction being executed by a processor for performing the following operations: sending a query request to a server, the query request carrying a user identification that needs a classification query; receiving possible classifications of the user identification and a ranking thereof in each of the possible classifications that are returned by the server according to the query request, the possible classifications and the rankings being obtained by the server by analyzing the user identification according to classification basis information, and the classification basis information including a marking historical record, a quantity of incoming and outgoing calls, incoming and outgoing call time periods, and/or regional distribution of users; and marking the user identification according to the possible classifications and the rankings.

According to the embodiments of the present disclosure, the server is configured to analyze a user identification according to classification basis information of the user identification, for example, a marking historical record, a quantity of incoming and outgoing calls, incoming and outgoing call time periods, and/or regional distribution of users, to obtain possible classifications of the user identification and a ranking thereof in each of the possible classifications, and then provide the possible classifications and the rankings to the client, so that the client can mark the user identification with reference to the possible classifications and the rankings. Therefore, compared with a solution in which a user marks a user identification only depending on subjective judgment of the user in the existing technology, the solution of the present disclosure can greatly increase the accuracy rate of marking; moreover, because according to the solution, the possible classifications and the rankings can be provided to the client to guide the user, user's operations are also well facilitated, and a marking rate can be improved, thereby providing abundant data foundation for other subsequent operations based on marking.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person skilled in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are merely some of the embodiments of the present disclosure rather than all of the embodiments. All other embodiments obtained by a person skilled in the art based on the embodiments of the present disclosure without creative efforts shall fall within the protection scope of the present disclosure.

The embodiments of the present disclosure provide a user identification marking method, apparatus, and system.

Figure 1A:
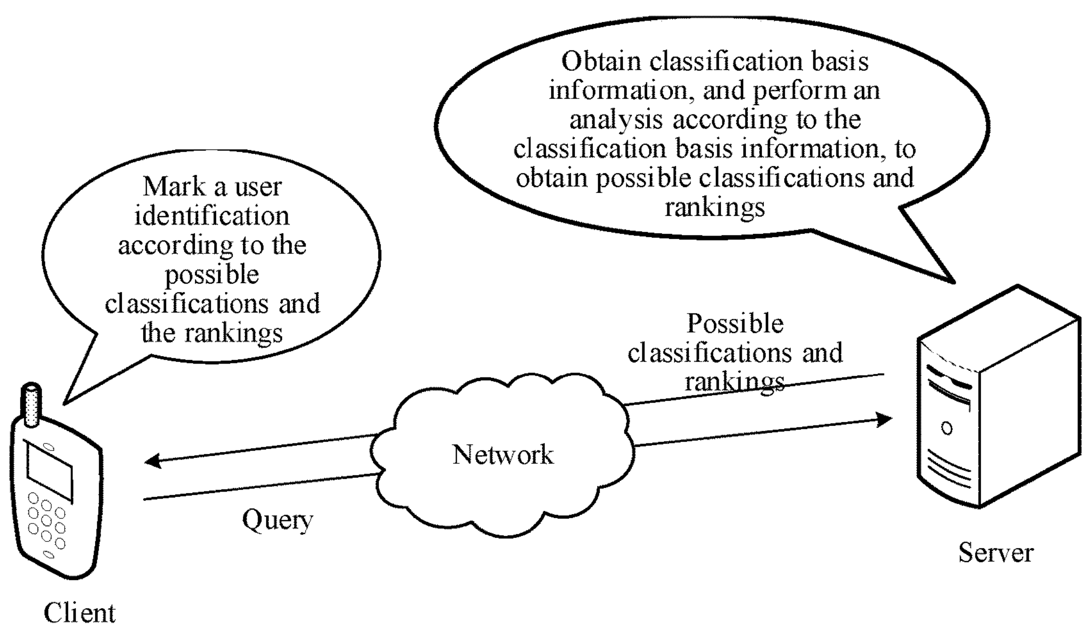
FIG. 1*a* is a schematic diagram of a scenario in which a user identification marking method is used according to an embodiment of the present disclosure.

As shown in FIG. 1*a*, a user identification marking system may include a server and a client. The server can receive a query request that is sent by the client and is about a user identification that needs a classification analysis, and then obtain classification basis information of the user identification according to the query request, where the classification basis information includes, for example, a marking historical record, a quantity of incoming and outgoing calls, incoming and outgoing call time periods, and/or regional distribution of users, and analyze the user identification according to the classification basis information, to obtain possible classifications of the user identification and a ranking thereof in each of the possible classifications, and then provide the possible classifications and the rankings to the client, so that the client marks the user identification according to the possible classifications and the rankings.

The following separately provides detailed description.

Embodiment 1

This embodiment provides a description from a perspective of a user identification marking apparatus, where the user identification marking apparatus may be specifically integrated in a server, such as a cloud server.

Disclosed is a user identification marking method, including: determining a user identification that needs a classification analysis; obtaining classification basis information of the user identification, the classification basis information including a marking historical record, a quantity of incoming and outgoing calls, incoming and outgoing call time periods, and/or regional distribution of users; analyzing the user identification according to the classification basis information, to obtain possible classifications of the user identification and a ranking thereof in each of the possible classifications; and providing the possible classifications and the rankings to a client, so that the client marks the user identification according to the possible classifications and the rankings.

Figure 1B:
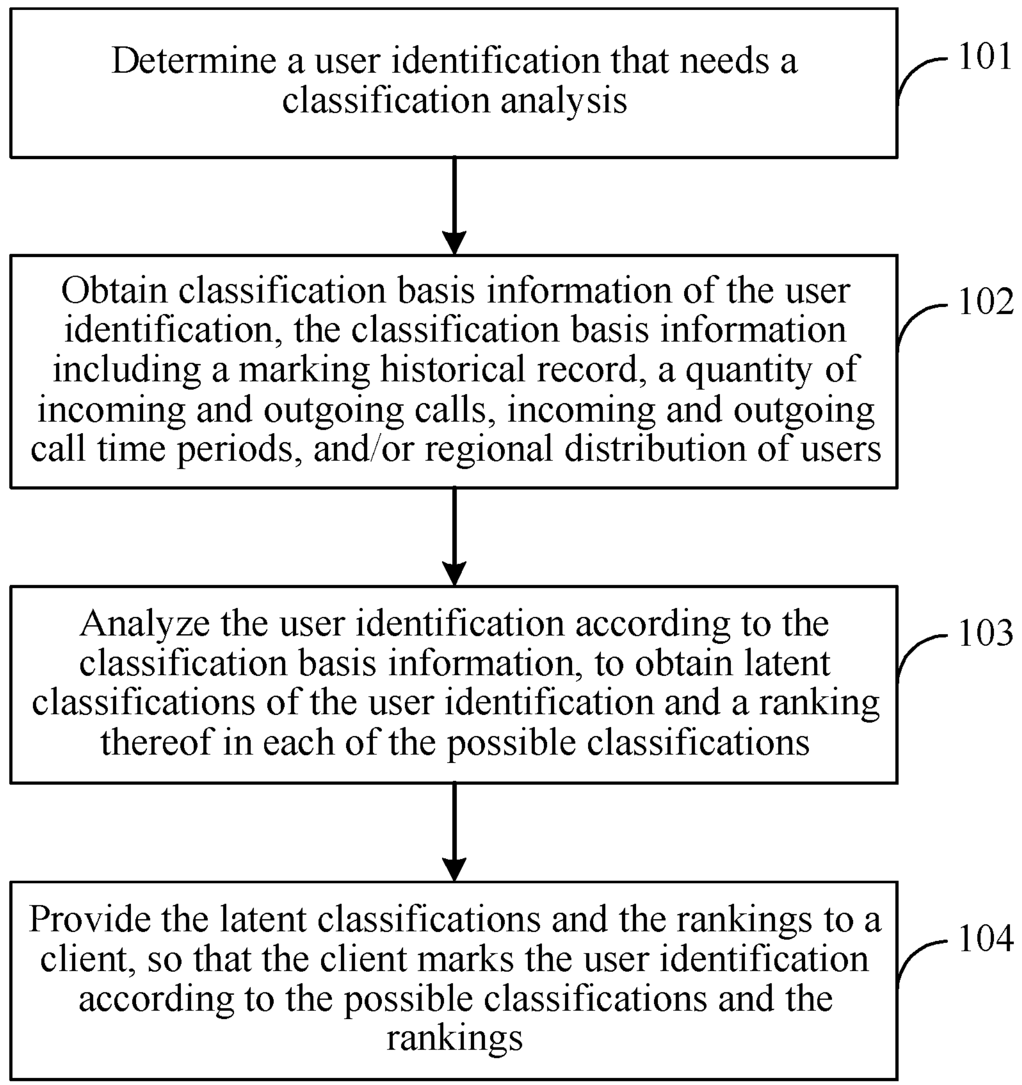
FIG. 1*b* is a flowchart of a user identification marking method according to an embodiment of the present disclosure.

As shown in FIG. 1*b*, a specific process of the user identification marking method may be as follows:

101: Determine a user identification that needs a classification analysis.

The user identification may include a user terminal identification, a user email account, and/or an instant messaging account, and the like. The terminal identification may be a phone number, a fixed-line number, a short number, or the like.

102: Obtain classification basis information of the user identification.

The classification basis information may include a marking historical record, a quantity of incoming and outgoing calls, incoming and outgoing call time periods, and/or regional distribution of users. The marking historical record includes information marked by the user, also includes information marked by other users, and further includes other marker information, for example, information marked by a cooperation partner. In addition, the classification basis information may further include some other network information, for example, information about discovery of a web crawler.

103: Analyze the user identification according to the classification basis information, to obtain possible classifications of the user identification and a ranking thereof in each of the possible classifications.

An analysis method may be set according to requirements of practical application. For example, the analysis manner may be specifically as follows: determining a quantity of markings of the user identification in each of the classifications according to the marking historical record, and if the quantity of markings in a classification exceeds a preset first threshold, determining that the classification corresponding to the quantity of markings is a possible classification of the user identification; and/or determining a quantity of uses of the user identification within a preset time period according to the quantity of incoming and outgoing calls and the incoming and outgoing time periods, and determining that a classification corresponding to the preset time period is a possible classification of the user identification if the quantity of uses within the preset time period exceeds a preset second threshold; and/or determining a quantity of uses of the user identification within a preset area according to the quantity of incoming and outgoing calls and the regional distribution of users, and determining that a classification corresponding to the preset area is a possible classification of the user identification if the quantity of uses within the preset area exceeds a preset third threshold.

The first threshold, the second threshold, and the third threshold may be set according to the requirements of practical application, and details are not described herein again.

Thereafter, these possible classifications may be ranked. For example, probabilities of the user identification in these possible classifications may be separately calculated, and then ranking is performed according to the probabilities. For example, if the possible classifications include a “nuisance call” and an “advertising promotion”, in this case, a probability that the user identification belongs to the “nuisance call” may be calculated, and a probability that the user identification belongs to the “advertising promotion” may be calculated, and then ranking is performed according to the two probabilities, so that a user knows the most probable classification of the user identification.

104: Provide the possible classifications and the rankings to a client, so that the client marks the user identification according to the possible classifications and the rankings.

For example, the possible classifications and the rankings may be pushed to the client. For example, a push message about the possible classifications and the rankings of the user identification is sent to the client; alternatively, the possible classifications and the rankings may also be delivered to the client only when the user puts forward a request, that is, the process may be as follows: receiving a query request that is sent by the client and carries the user identification, and returning corresponding possible classifications and rankings of the user identification to the client according to the query request.

In addition, after the user marks the user identification, marker information uploaded by the user may also be received, and the marker information is stored to update the marking historical record for use in subsequent analysis. That is, the user identification marking method may further include: receiving marker information that is uploaded by the client and is about the user identification; and storing the marker information in the marking historical record of the user identification.

Based on the above, according to this embodiment, the server is configured to analyze a user identification according to classification basis information of the user identification, for example, a marking historical record, a quantity of incoming and outgoing calls, incoming and outgoing call time periods, and/or regional distribution of users, to obtain possible classifications of the user identification and a ranking thereof in each of the possible classifications, and then provide the possible classifications and the rankings to the client, so that the client can mark the user identification with reference to the possible classifications and the rankings. Therefore, compared with a solution in which a user marks a user identification only depending on subjective judgment of the user in the existing technology, the solution of the present disclosure can greatly increase an accuracy rate of marking; moreover, because according to the solution, the possible classifications and the rankings can be provided to the client to guide the user, user's operations are also greatly facilitated, and a marking rate can be improved, thereby providing abundant data foundation for other subsequent operations based on marking.

Embodiment 2

This embodiment provides a description from a perspective of another user identification marking apparatus. The user identification marking apparatus may be specifically integrated in a client, where the client may be specifically integrated in a terminal, for example, a mobile phone, a tablet computer, a notebook computer, or a personal computer (PC).

Disclosed is a user identification marking method, including: sending a query request to a server, the query request carrying a user identification that needs a classification query; receiving possible classifications of the user identification and a ranking thereof in each of the possible classifications that are returned by the server according to the query request, the possible classifications and the rankings being obtained by the server by analyzing the user identification according to classification basis information, and the classification basis information including a marking historical record, a quantity of incoming and outgoing calls, incoming and outgoing call time periods, and/or regional distribution of users; and marking the user identification according to the possible classifications and the rankings.

Figure 2:
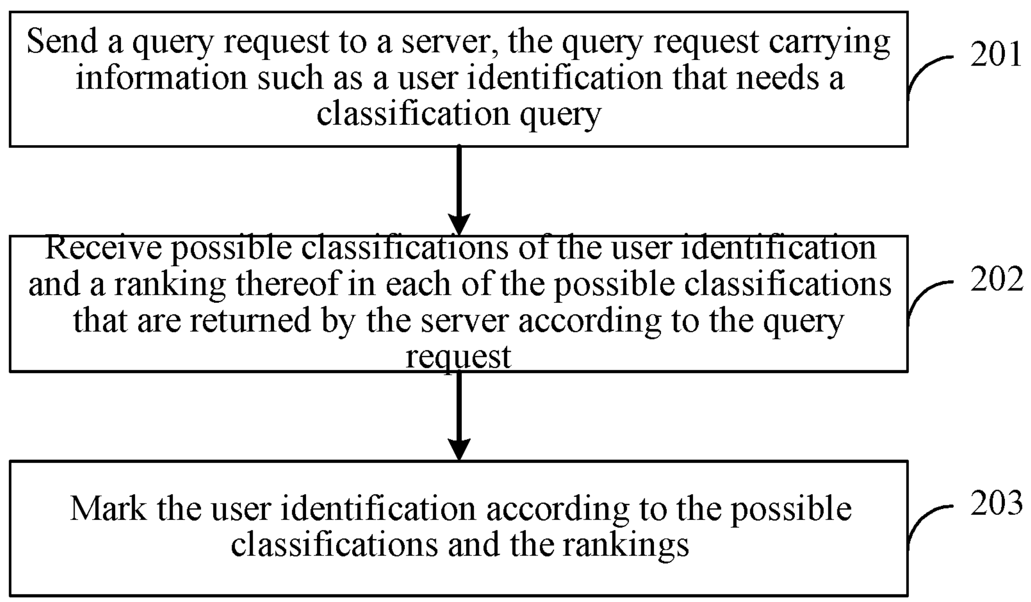
FIG. 2 is another flowchart of a user identification marking method according to an embodiment of the present disclosure.

As shown in FIG. 2, a specific process of the user identification marking method may be as follows:

201: Send a query request to a server, the query request carrying information such as a user identification that needs a classification query.

202: Receive possible classifications of the user identification and a ranking thereof in each of the possible classifications that are returned by the server according to the query request.

The possible classifications and the rankings are obtained by the server by analyzing the user identification according to classification basis information, where the classification basis information includes a marking historical record, a quantity of incoming and outgoing calls, incoming and outgoing call time periods, and/or regional distribution of users. Refer to Embodiment 1 for details, which are not described herein again.

203: Mark the user identification according to the possible classifications and the rankings. For example, this step may be specifically as follows:

(1) Display the Possible Classifications and the Rankings.

For example, the possible classifications and the rankings may be specifically displayed on a preset interface. For example, each of the possible classifications may be used as a label, and a ranking of the possible classification is displayed in the label or under the label. In addition, a probability that the user identification belongs to the possible classification may also be displayed under the label.

(2) Receive a Marking Instruction that is Entered by a User According to the Displayed Possible Classifications and Rankings.

For example, the user may select a corresponding classification as a marker of the user identification by tapping a label of a displayed possible classification. For example, if the user taps the possible classification "nuisance call" and presses a determining key, the marking instruction is triggered.

There may be one or more markers. For example, a phone number may be marked as a "nuisance call" and marked as an "advertising promotion", and the details are not described herein again.

(3) Mark the User Identification According to the Marking Instruction.

For example, if the user taps the "nuisance call" and presses the determining key in step (2), in this case, it can be determined that the user marks the user identification as the "nuisance call". For another example, if the user taps the "advertising promotion" and presses the determining key in step (2), in this case, it can be determined that the user marks the user identification as the "advertising promotion".

Optionally, in addition to marking the user identification according to the possible classifications and the rankings, a user-defined marker of a user can also be accepted. That is, the user identification marking method further includes: receiving user-defined marker information that is entered by a user, and marking the user identification according to the user-defined marker information.

In addition, after the user identification is marked, details of the marking may also be uploaded to the server in a form of marker information, so that the server stores the marker information to update the marking historical record for use in subsequent analysis. That is, after the step of "marking the user identification", the user identification marking method may further include: sending marker information about the user identification to the server, so that the server stores the marker information in the marking historical record of the user identification.

Based on the above, according to this embodiment, the client may send a user identification that needs a classification query to the server; the server analyzes the user identification according to classification basis information of the user identification, for example, a marking historical record, a quantity of incoming and outgoing calls, incoming and outgoing call time periods, and/or regional distribution of users, to obtain possible classifications of the user identification and a ranking thereof in each of the possible classifications, and then the client receives the possible classifications and the rankings that are returned by the server, and marks the user identification with reference to the possible classifications and the rankings. In this solution, the server can determine the possible classifications and the rankings of the user identification by means of an analysis according to information of different sources, and the client performs further judgment according to the possible classifications and the rankings. Therefore, compared with a solution in which a user marks a user identification only depending on subjective judgment of the user in the existing technology, the solution of the present disclosure can greatly increase an accuracy rate of marking; moreover, because according to the solution, the possible classifications and the rankings can be provided to the client to guide the user, user's operations are also greatly facilitated, and a marking rate can be improved, thereby providing abundant data foundation for other subsequent operations based on marking.

Embodiment 3

According to the methods described in Embodiment 1 and Embodiment 2, the following further provides a detailed description by example.

In this embodiment, a case in which a user identification marking method specifically involves a cloud server and a client is used as an example for description.

Figure 3A:
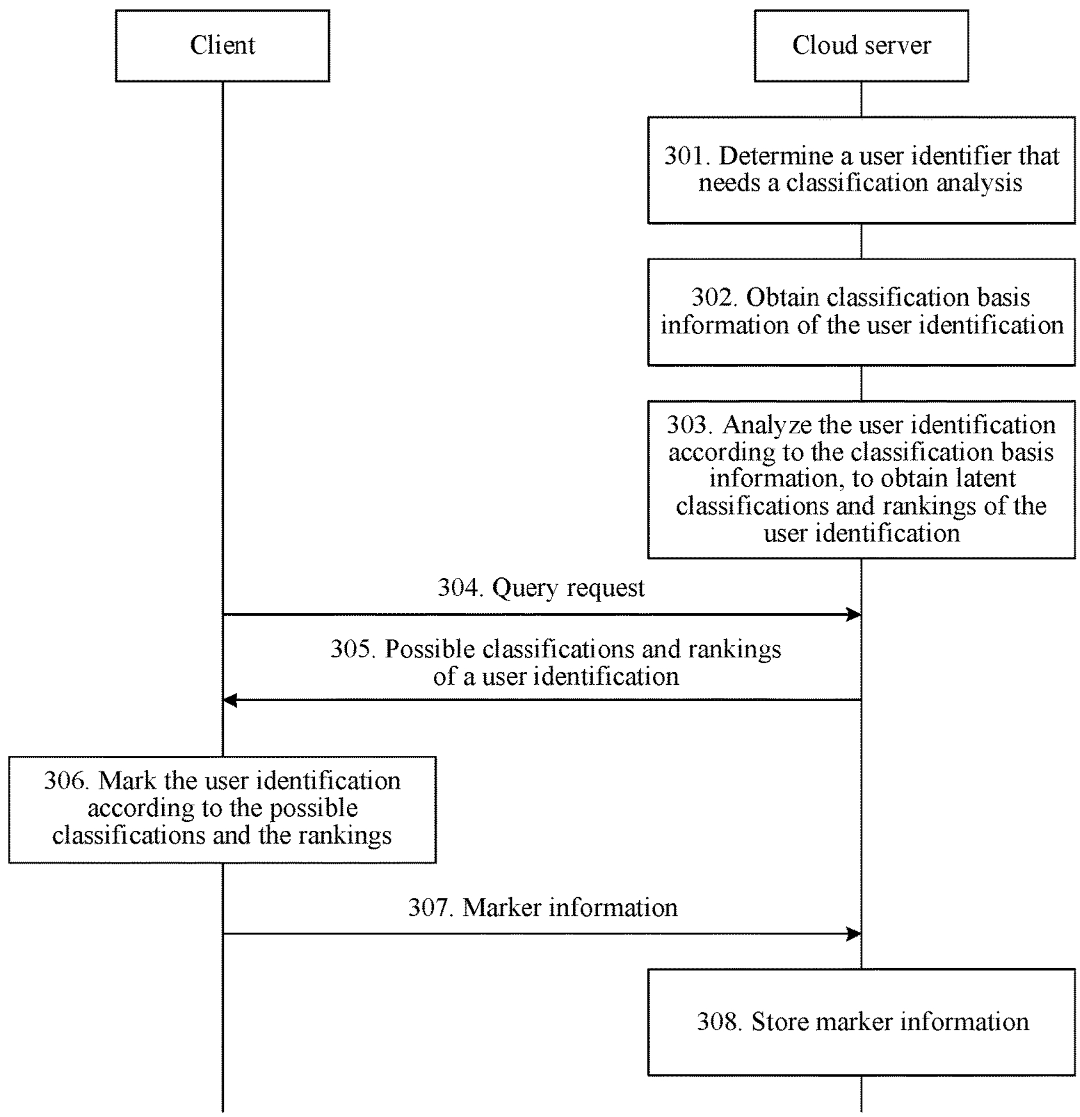
FIG. 3*a* is still another flowchart of a user identification marking method according to an embodiment of the present disclosure.

As shown in FIG. 3*a*, a specific process of a user identification marking method may be as follows.

The following provides a description by using an analysis process of a single user identification as an example. It should be understood that an analysis process of another user identification is the same as the analysis process in the example. Refer to steps 301 to 303 for details.

301: A cloud server determines a user identifier that needs a classification analysis.

The user identification may include a user terminal identification, a user email account, and/or an instant messaging account, and the like. The terminal identification may be a phone number, a fixed-line number, a short number, or the like.

302: The cloud server obtains classification basis information of the user identification.

The classification basis information may include a marking historical record, a quantity of incoming and outgoing calls, incoming and outgoing call time periods, and/or regional distribution of users. The marking historical record includes information marked by the user, also includes information marked by other users, and further includes other marker information, for example, information marked by a cooperation partner.

In addition, the classification basis information may further include some other network information, for example, information about discovery of a web crawler.

303: Analyze the user identification according to the classification basis information, to obtain possible classifications of the user identification and a ranking thereof in each of the possible classifications.

There are multiple analysis manners. For example, any one or more of the following manners may be specifically used.

(1) Determining a quantity of markings of the user identification in each of the classifications according to the marking historical record, and if the quantity of markings in a classification exceeds a preset first threshold, determining that the classification corresponding to the quantity of markings is a possible classification of the user identification, and calculating a ranking of the user identification in the possible classification according to the quantity of markings.

For example, for a phone number 12345678, if the phone number is marked as a "nuisance call" for 1000 times, and is marked as an "advertising promotion" for 100 times, but the first threshold is set as 800 times, the "nuisance call" may be used as a possible classification of the phone number.

For another example, for a phone number 12345678, if the phone number is marked as a "nuisance call" for 1000 times, and is marked as an "advertising promotion" for 900 times, but the first threshold is set as 800 times, both the "nuisance call" and the "advertising promotion" may be used as possible classifications of the phone number.

(2) Determining a quantity of uses of the user identification within a preset time period according to the quantity of incoming and outgoing calls and the incoming and outgoing time periods, and determining that a classification corresponding to the preset time period is a possible classification of the user identification if the quantity of uses within the preset time period exceeds a preset second threshold.

For example, it may be set that in a time period between 2:00 a.m. and 5:00 a.m., if a quantity of active calls exceeds 1000, the call is defined as a "nuisance call"; then if it is determined that a quantity of active calls of a user identification, such as a phone number 12345678, between 2:00 a.m. and 5:00 a.m. is 5000 according to the quantity of incoming and outgoing calls and the incoming and outgoing time periods of the user identification, in this case, it can be determined that the "nuisance call" is a possible classification of the phone number.

(3) Determining a quantity of uses of the user identification within a preset area according to the quantity of incoming and outgoing calls and the regional distribution of users, and determining that a classification corresponding to the preset area is a possible classification of the user identification if the quantity of uses within the preset area exceeds a preset third threshold.

For example, it may be set that if a user identification is used for more than 1000 times within an area A (a location of an advertising promotion suspicion), the user identification is defined as an "advertising promotion"; Then if it is determined that a user identification, such as a phone number 12345678, is used for 5000 times in the area A according to the regional distribution of users and the quantity of incoming and outgoing calls of the user identification, in this case, it can be determined that the "advertising promotion" is a possible classification of the phone number.

The first threshold, the second threshold, and the third threshold may be set according to the requirements of practical application, and details are not described herein again.

Thereafter, these possible classifications may be ranked. For example, probabilities of the user identification in these possible classifications may be separately calculated, and then ranking is performed according to the probabilities. For example, if the possible classifications include a "nuisance call" and an "advertising promotion", in this case, a probability that the user identification belongs to the "nuisance call" may be calculated, and a probability that the user identification belongs to the "advertising promotion" may be calculated, and then ranking is performed according to the two probabilities, so that a user knows the most probable classification of the user identification.

304: A client sends a query request to the server, the query request carrying information such as a user identification that needs a classification query.

305: The cloud server returns corresponding possible classifications of the user identification and the ranking thereof in each of the possible classifications to the client according to the query request.

Figure 3B:
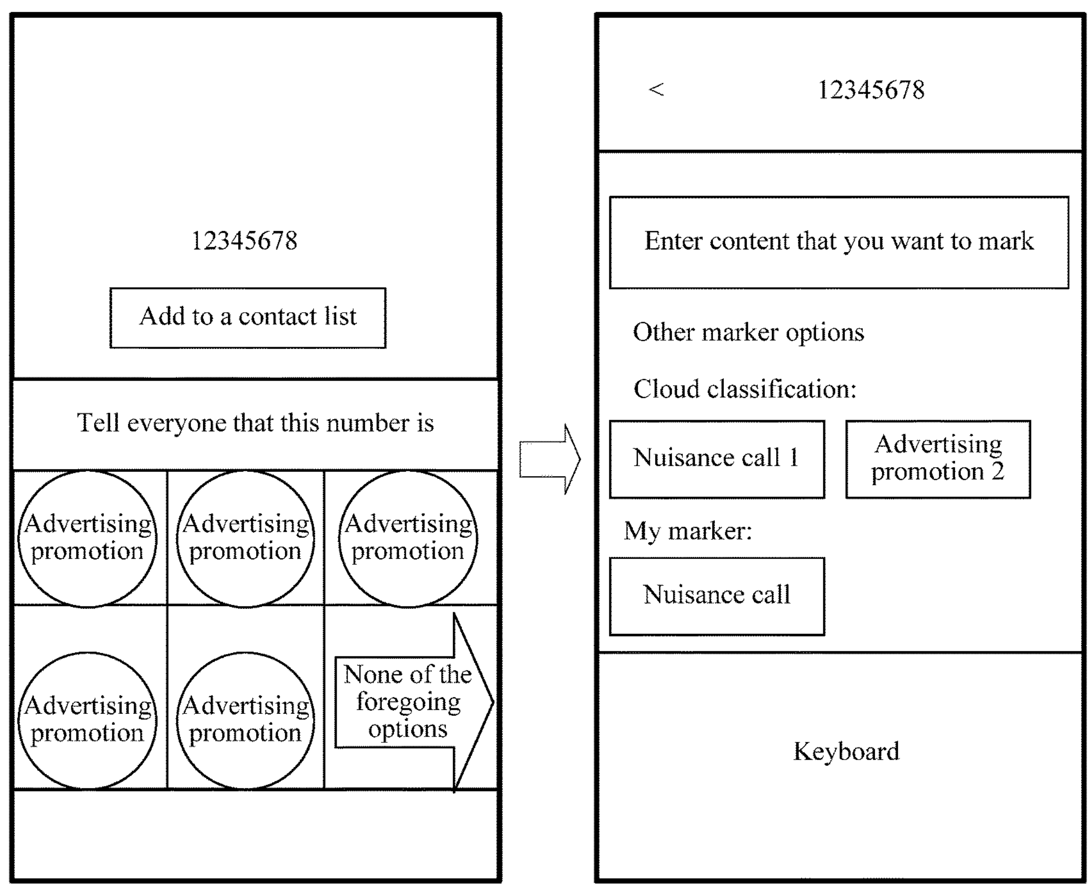
FIG. 3*b* is an exemplary diagram of display in a client in a user identification marking method according to an embodiment of the present disclosure.

For example, referring to FIG. 3*b*, if a user requests to query the phone number 12345678, the cloud server may return corresponding possible classifications and rankings of the phone number to the client, where the possible classifications are, for example, a "nuisance call" and an "advertising promotion", and separately display the rankings of the "nuisance call" and the "advertising promotion". For example, if the ranking of the "nuisance call" is 1, and the ranking of the "advertising promotion" is 2, a "nuisance call 1" and an "advertising promotion 2" may be specifically displayed. Refer to the right figure of FIG. 3*b*.

It should be noted that, if the possible classifications and the rankings of the user identification are stored in the cloud server, in this case, the stored possible classifications and rankings may be directly returned; however, if the possible classifications and the rankings of the user identification do not exist in the cloud server, steps 301 to 303 may be performed, to determine the possible classifications and the rankings of the user identification, and the details are not described herein again.

306: The client marks the user identification according to the possible classifications and the rankings. For example, this step may be specifically as follows: displaying the possible classifications and the rankings, receiving a marking instruction that is entered by a user according to the displayed possible classifications and rankings, and marking the user identification according to the marking instruction.

For example, each of the possible classifications may be specifically used as a label, and the ranking of the possible classification is displayed in the label. In addition, a probability that the user identification belongs to the possible classification may also be displayed, so that the user can select a corresponding classification as a marker of the user identification by tapping a label of a displayed possible classification. For example, if the user taps a possible classification "nuisance call" and presses a determining key, in this case, it can be determined that the user marks the user identification as the "nuisance call". Refer to FIG. 3*b*.

It should be noted that a specific display interface of the client may be set according to requirements of practical application, and FIG. 3*b* is merely exemplary. It should be understood that the figure is not used as a limitation.

Optionally, in addition to marking the user identification according to the possible classifications and the rankings, a user-defined marker of a user can also be accepted. For example, specifically, user-defined marker information entered by a user may be received, and the user identification is marked according to the user-defined marker information, and details are not described herein again.

In addition, after the user identification is marked, details of the marking may also be uploaded to the server in a form of marker information, so that the server stores the marker information to update the marking historical record for use in subsequent analysis. That is, in the method, steps 307 and 308 may further be performed as follows:

307: The client sends marker information about the user identification to the server.

308: After receiving the marker information that is uploaded by the client and is about the user identification, the cloud server stores the marker information in the marking historical record of the user identification.

Based on the above, according to this embodiment, the cloud server can analyze the user identification according to classification basis information of the user identification, for example, a marking historical record, a quantity of incoming and outgoing calls, incoming and outgoing call time periods, and/or regional distribution of users, to obtain possible classifications of the user identification and a ranking thereof in each of the possible classifications, and then returns corresponding possible classifications and rankings of the user identification to the client for reference when the client needs a query, so as to facilitate marking the user identification by a user. In this solution, the server can determine the possible classifications and the rankings of the user identification by means of an analysis according to information of different sources, and the client performs further judgment according to the possible classifications and the rankings. Therefore, compared with a solution in which a user marks a user identification only depending on subjective judgment of the user in the existing technology, the solution of the present disclosure can greatly increase an accuracy rate of marking; moreover, because according to the solution, the possible classifications and the rankings can be provided to the client to guide the user, user's operations are also greatly facilitated, and a marking rate can be improved, thereby providing abundant data foundation for other subsequent operations based on marking.

Embodiment 4

Figure 4:
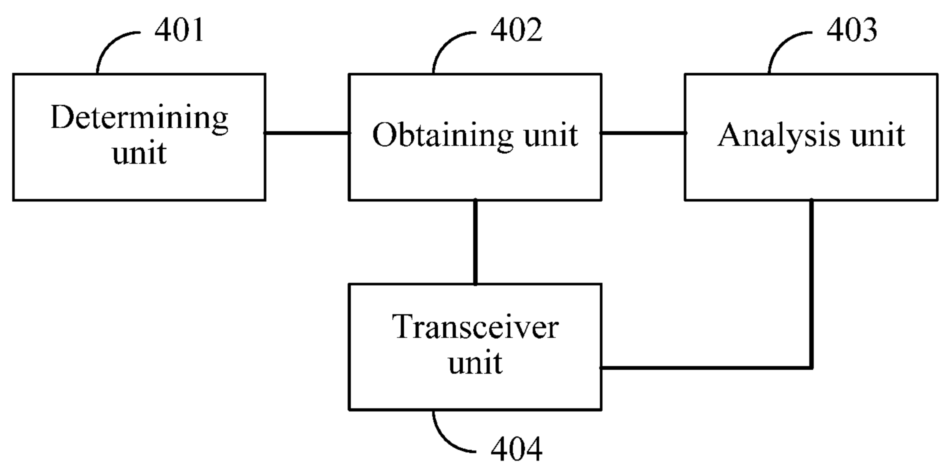
FIG. 4 is a schematic structural diagram of a server according to an embodiment of the present disclosure.

Correspondingly, this embodiment of the present disclosure further provides a user identification marking apparatus that may be used as a server in this embodiment of the present disclosure. As shown in FIG. 4, the server may include a determining unit 401, an obtaining unit 402, an analysis unit 403, and a transceiver unit 404 as follows:

(1) Determining Unit 401;

The determining unit 401 is configured to determine a user identification that needs a classification analysis.

The user identification may include a user terminal identification, a user email account, and/or an instant messaging account, and the like. The terminal identification may be a phone number, a fixed-line number, a short number, or the like.

(2) Obtaining Unit 402;

The obtaining unit 402 is configured to obtain classification basis information of the user identification.

The classification basis information includes information such as a marking historical record, a quantity of incoming and outgoing calls, incoming and outgoing call time periods, and/or regional distribution of users. Refer to the foregoing embodiment for details.

(3) Analysis Unit 403;

The analysis unit 403 is configured to analyze the user identification according to the classification basis information, to obtain possible classifications of the user identification and a ranking thereof in each of the possible classifications.

An analysis manner may be set according to requirements of practical application. That is, the analysis unit 403 may be specifically configured to: determine a quantity of markings of the user identification in each of the classifications according to the marking historical record, and if the quantity of markings in a classification exceeds a preset first threshold, determine that the classification corresponding to the quantity of markings is a possible classification of the user identification; and/or determine a quantity of uses of the user identification within a preset time period according to the quantity of incoming and outgoing calls and the incoming and outgoing time periods, and determine that a classification corresponding to the preset time period is a possible classification of the user identification if the quantity of uses within the preset time period exceeds a preset second threshold; and/or determine a quantity of uses of the user identification within a preset area according to the quantity of incoming and outgoing calls and the regional distribution of users, and determine that a classification corresponding to the preset area is a possible classification of the user identification if the quantity of uses within the preset area exceeds a preset third threshold.

The first threshold, the second threshold, and the third threshold may be set according to the requirements of practical application, and details are not described herein again.

Thereafter, the analysis unit 403 may rank the possible classifications. For example, probabilities of the user identification in these possible classifications may be separately calculated, and then ranking is performed according to the probabilities. For example, if the possible classifications include a "nuisance call" and an "advertising promotion", in this case, a probability that the user identification belongs to the "nuisance call" may be calculated, and a probability that the user identification belongs to the "advertising promotion" may be calculated, and then ranking is performed according to the two probabilities, so that a user knows the most probable classification of the user identification.

(4) Transceiver Unit 404;

The transceiver unit 404 is configured to provide the possible classifications and the rankings to a client, so that the client marks the user identifier according to the possible classifications and the rankings.

For example, the transceiver unit 404 may be specifically configured to push the possible classifications and the rankings to the client; or the transceiver unit 404 may be specifically configured to receive a query request that is sent by the client and carries the user identification, and return corresponding possible classifications and rankings of the user identification to the client according to the query request.

In addition, after the user marks the user identification, marker information uploaded by the user may also be received, and the marker information is stored to update the marking historical record for use in subsequent analysis. That is, the server may further include a storage unit as follows: the transceiver unit 404 may be further configured to receive marker information that is uploaded by the client and is about the user identifier; and the storage unit is configured to store the marker information in the marking historical record of the user identifier.

In specific implementation, the foregoing units may be implemented as independent entities, and may also be combined in any manner and be implemented as a same or several entities. The specific implementation of the foregoing units may be similar to the description provided with the method embodiments, and details are not described herein again.

Based on the above, according to this embodiment, the analysis unit 403 of the server may analyze a user identification according to classification basis information of the user identifier, for example, a marking historical record, a quantity of incoming and outgoing calls, incoming and outgoing call time periods, and/or regional distribution of users, to obtain possible classifications of the user identification and a ranking thereof in each of the possible classifications, and then the transceiver unit 404 provides the possible classifications and the rankings to the client, so that the client can mark the user identification with reference to the possible classifications and the rankings. Therefore, compared with a solution in which a user marks a user identification only depending on subjective judgment of the user in the existing technology, the solution of the present disclosure can greatly increase an accuracy rate of marking; moreover, because according to the solution, the possible classifications and the rankings can be provided to the client to guide the user, user's operations are also greatly facilitated, and a marking rate can be improved, thereby providing abundant data foundation for other subsequent operations based on marking.

Embodiment 5

Figure 5:
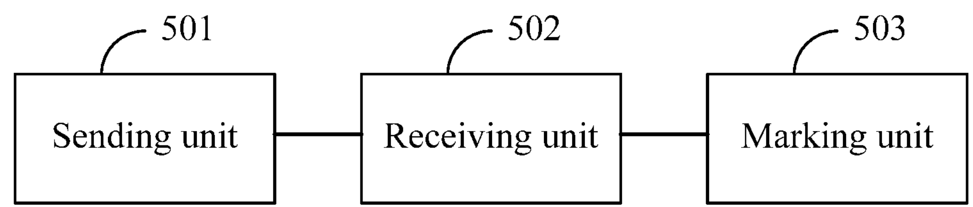
FIG. 5 is a schematic structural diagram of a client according to an embodiment of the present disclosure.

Correspondingly, this embodiment of the present disclosure further provides another user identification marking apparatus that may be used as a client in this embodiment of the present disclosure. As shown in FIG. 5, the client may include a sending unit 501, a receiving unit 502, and a marking unit 503 as follows:

The sending unit 501 is configured to send a query request to a server, the query request carrying a user identification that needs a classification query.

The receiving unit 502 is configured to receive possible classifications of the user identification and a ranking thereof in each of the possible classifications that are returned by the server according to the query request.

The possible classifications and the rankings are obtained by the server by analyzing the user identification according to classification basis information, where the classification basis information includes a marking historical record, a quantity of incoming and outgoing calls, incoming and outgoing call time periods, and/or regional distribution of users. Refer to the foregoing embodiments for details, which are not described herein again.

The marking unit 503 is configured to mark the user identifier according to the possible classifications and the rankings.

For example, the marking unit 503 is specifically configured to display the possible classifications and the rankings, receive a marking instruction that is entered by a user according to the displayed possible classifications and rankings, and mark the user identification according to the marking instruction.

Optionally, in addition to marking the user identification according to the possible classifications and the rankings, a user-defined marker may also be accepted. That is, the client may further include a user-defined unit as follows:

The user-defined unit is configured to receive user-defined marker information that is entered by a user, and mark the user identification according to the user-defined marker information.

In addition, after the user identification is marked, details of the marking may also be uploaded to the server in a form of marker information, so that the server stores the marker information to update the marking historical record for use in subsequent analysis. That is, the sending unit 501 is further configured to send marker information about the user identification to the server, so that the server stores the marker information in the marking historical record of the user identification.

In specific implementation, the foregoing units may be implemented as independent entities, and may also be combined in any manner and be implemented as a same or several entities. The specific implementation of the foregoing units is described in the foregoing method embodiments, and details are not described herein again.

The client may be specifically integrated in a terminal, such as a mobile phone, a tablet computer, a notebook computer, or a PC.

Based on the above, according to this embodiment, the sending unit 501 of the client may send a user identification that needs a classification query to the server; the server analyzes the user identification according to classification basis information of the user identification, for example, a marking historical record, a quantity of incoming and outgoing calls, incoming and outgoing call time periods, and/or regional distribution of users, to obtain possible classifications of the user identification and a ranking thereof in each of the possible classifications, and then the receiving unit 502 receives the possible classifications and the rankings that are returned by the server, and the marking unit 503 marks the user identification with reference to the possible classifications and the rankings. In this solution, the server can determine the possible classifications and the rankings of the user identification by means of an analysis according to information of different sources, and the client performs further judgment according to the possible classifications and the rankings. Therefore, compared with a solution in which a user marks a user identification only depending on subjective judgment of the user in the existing technology, the solution of the present disclosure can greatly increase an accuracy rate of marking; moreover, because according to the solution, the possible classifications and the rankings can be provided to the client to guide the user, user's operations are also greatly facilitated, and a marking rate can be improved, thereby providing abundant data foundation for other subsequent operations based on marking.

Embodiment 6

In addition, this embodiment of the present disclosure further provides a user identification marking system, including any user identification marking apparatus used as a server provided in the embodiments of the present disclosure and any user identification marking apparatus used as a client provided in the embodiments of the present disclosure. Refer to Embodiment 4 for details of the server, and refer to Embodiment 5 for details of the client. For example, the server and the client may be as follows:

The server is configured to: determine a user identification that needs a classification analysis, and obtain classification basis information of the user identification, the classification basis information including a marking historical record, a quantity of incoming and outgoing calls, incoming and outgoing call time periods, and/or regional distribution of users; analyze the user identification according to the classification basis information, to obtain possible classifications of the user identification and a ranking thereof in each of the possible classifications, and send corresponding possible classifications and rankings of the user identification to the client when receiving a query message from the client.

The client is configured to: send a query request to the server, the query request carrying a user identification that needs a classification query; receive possible classifications of the user identification and a ranking thereof in each of the possible classifications that are returned by the server according to the query request; and mark the user identification according to the possible classifications and the rankings.

In addition, after a user marks the user identification, marker information uploaded by the user may also be received, and the marker information is stored to update the marking historical record for use in subsequent analysis. That is, the client may be further configured to upload marker information about the user identification to the server.

In this case, the server may be further configured to receive the marker information that is uploaded by the client and is about the user identification, and store the marker information in the marking historical record of the user identification.

Refer to the foregoing embodiments for specific implementation of the foregoing devices, and details are not described herein again.

Because the user identification marking system may include any server and any client provided in the embodiments of the present disclosure, beneficial effects that can be implemented by any server and any client that are provided in the embodiments of the present disclosure can be implemented. Refer to the forging embodiments for details, which are not described herein again.

A person of ordinary skill in the art may understand that, a program may be used to instruct related hardware to complete all or part of the steps in the methods in the foregoing embodiments. The program may be stored in a computer readable storage medium. The storage medium may include a read only memory (ROM), a random access memory (RAM), a magnetic disk, an optical disc, or the like.

The above describes a user identification marking method, apparatus and system provided in the embodiments of the present disclosure in detail. In this specification, specific examples are used to describe the principles and implementation manners of the present disclosure. Description of the foregoing embodiments is merely intended to help understand the methods and a core idea of the present disclosure. Meanwhile, a person skilled in the art can make variations to the specific implementation manners and the application scope according to the idea of the present disclosure. In conclusion, this specification shall not be understood as a limitation to the present disclosure.

What is claimed is:

1. A user identification marking method, comprising:

determining a user identification that needs a classification analysis;

obtaining classification basis information of the user identification, comprising:

obtaining a marking historical record of the user identification, a quantity of incoming and outgoing calls of the user identification, incoming and outgoing call time periods of the user identification, and regional distribution of the user identification;

analyzing the user identification according to the classification basis information, to obtain possible classifications of the user identification and a ranking of the possible classifications in each of the possible classification, comprising:

determining a quantity of markings of the user identification in each of the classifications according to the marking historical record, and if the quantity of markings in a classification exceeds a preset first threshold, determining that the classification corresponding to the quantity of markings is a possible classification of the user identification;

determining a quantity of uses of the user identification within a preset time period according to the quantity of incoming and outgoing calls and the incoming and outgoing time periods, and determining that a classification corresponding to the preset time period is a possible classification of the user identification if the quantity of uses within the preset time period exceeds a preset second threshold; and determining a quantity of uses of the user identification within a preset area according to the quantity of incoming and outgoing calls and the regional distribution of users, and determining that a classification corresponding to the preset area is a possible classification of the user identification if the quantity of uses within the preset area exceeds a preset third threshold; and providing the possible classifications and the rankings to a client, wherein providing the rankings to the client comprises displaying a probability that the user identification belongs to the each of the possible classifications under a label of the rankings, wherein the probability of the each of the possible classifications is calculated separately.

2. The method according to claim 1, wherein the providing the possible classifications and the rankings to a client comprises:

pushing the possible classifications and the rankings to the client; or receiving a query request that is sent by the client and carries the user identification, and returning corresponding possible classifications and rankings of the user identification to the client according to the query request.

3. The method according to claim 1, wherein the method further comprises:

receiving marker information that is uploaded by the client and is about the user identification; and storing the marker information in the marking historical record of the user identification.

4. A user identification marking method, comprising:

sending a query request to a server, the query request carrying a user identification that needs a classification query;

receiving possible classifications of the user identification and a ranking of the possible classifications in each of the possible classifications that are returned by the server according to the query request, wherein:

the possible classifications and the rankings are obtained by the server by obtaining and analyzing the user identification according to classification basis information, including: determining a quantity of markings of the user identification in each of the classifications according to the marking historical record, and if the quantity of markings in a classification exceeds a preset first threshold, determining that the classification corresponding to the quantity of markings is a possible classification of the user identification; determining a quantity of uses of the user identification within a preset time period according to the quantity of incoming and outgoing calls and the incoming and outgoing time periods, and determining that a classification corresponding to the preset time period is a possible classification of the user identification if the quantity of uses within the preset time period exceeds a preset second threshold; and determining a quantity of uses of the user identification within a preset area according to the quantity of incoming and outgoing calls and the regional distribution of users, and determining that a classification corresponding to the preset area is a possible classification of the user identification if the quantity of uses within the preset area exceeds a preset third threshold; and the classification basis information comprises a marking historical record of the user identification, a quantity of incoming and outgoing calls of the user identification, incoming and outgoing call time periods of the user identification, and regional distribution of the user identification; and marking the user identification according to the possible classifications and the rankings, wherein marking the user identification comprises displaying a probability that the user identification belongs to the each of the possible classifications under a label of the rankings, wherein the probability of the each of the possible classifications is calculated separately.

5. The method according to claim 4, wherein the marking the user identification according to the possible classifications and the rankings comprises:

displaying the possible classifications and the rankings;

receiving a marking instruction that is entered by a user according to the displayed possible classifications and rankings, and marking the user identification according to the marking instruction.

6. The method according to claim 4, further comprising:

receiving user-defined marker information that is entered by a user; and marking the user identification according to the user-defined marker information.

7. The method according to claim 4, wherein after marking the user identification, the method further comprises:

sending marker information about the user identification to the server.

8. A non-transitory computer storage medium, the computer storage medium storing a processor executable instruction, the processor executable instruction being executed by a processor for performing the following operations:

determining a user identification that needs a classification analysis;

obtaining classification basis information of the user identification, the classification basis information comprising a marking historical record of the user identification, a quantity of incoming and outgoing calls of the user identification, incoming and outgoing call time periods of the user identification, and regional distribution of the user identification;

analyzing the user identification according to the classification basis information, to obtain possible classifications of the user identification and a ranking of the possible classifications in each of the possible classification, comprising:

determining a quantity of markings of the user identification in each of the classifications according to the marking historical record, and if the quantity of markings in a classification exceeds a preset first threshold, determining that the classification corresponding to the quantity of markings is a possible classification of the user identification;

determining a quantity of uses of the user identification within a preset time period according to the quantity of incoming and outgoing calls and the incoming and outgoing time periods, and determining that a classification corresponding to the preset time period is a possible classification of the user identification if the quantity of uses within the preset time period exceeds a preset second threshold; and determining a quantity of uses of the user identification within a preset area according to the quantity of incoming and outgoing calls and the regional distribution of users, and determining that a classification corresponding to the preset area is a possible classification of the user identification if the quantity of uses within the preset area exceeds a preset third threshold; and providing the possible classifications and the rankings to a client, wherein providing the rankings to the client comprises displaying a probability that the user identification belongs to the each of the possible classifications under a label of the ranking, wherein the probability of the each of the possible classifications is calculated separately.

9. The non-transitory computer storage medium according to claim 8, wherein the providing the possible classifications and the rankings to a client comprises:

pushing the possible classifications and the rankings to the client; or receiving a query request that is sent by the client and carries the user identification, and returning corresponding possible classifications and rankings of the user identification to the client according to the query request.

10. The non-transitory computer storage medium according to claim 8, wherein the processor executable instruction being executed by a processor for performing:

receiving marker information that is uploaded by the client and is about the user identification; and storing the marker information in the marking historical record of the user identification.

11. A non-transitory computer storage medium, the computer storage medium storing a processor executable instruction, the processor executable instruction being executed by a processor for performing the following operations:

sending a query request to a server, the query request carrying a user identification that needs a classification query;

receiving possible classifications of the user identification and a ranking of the possible classifications in each of the possible classifications that are returned by the server according to the query request, wherein:

the possible classifications and the rankings are obtained by the server by obtaining and analyzing the user identification according to classification basis information, including: determining a quantity of markings of the user identification in each of the classifications according to the marking historical record, and if the quantity of markings in a classification exceeds a preset first threshold, determining that the classification corresponding to the quantity of markings is a possible classification of the user identification; determining a quantity of uses of the user identification within a preset time period according to the quantity of incoming and outgoing calls and the incoming and outgoing time periods, and determining that a classification corresponding to the preset time period is a possible classification of the user identification if the quantity of uses within the preset time period exceeds a preset second threshold; and determining a quantity of uses of the user identification within a preset area according to the quantity of incoming and outgoing calls and the regional distribution of users, and determining that a classification corresponding to the preset area is a possible classification of the user identification if the quantity of uses within the preset area exceeds a preset third threshold; and the classification basis information comprises a marking historical record of the user identification, a quantity of incoming and outgoing calls of the user identification, incoming and outgoing call time periods of the user identification, and regional distribution of the user identification; and marking the user identification according to the possible classifications and the rankings, wherein marking the user identification comprises displaying a probability that the user identification belongs to the each of the possible classifications under a label of the ranking, wherein the probability of the each of the possible classifications is calculated separately.

12. The non-transitory computer storage medium according to claim 11, wherein the marking the user identification according to the possible classifications and the rankings comprises:

displaying the possible classifications and the rankings;

receiving a marking instruction that is entered by a user according to the displayed possible classifications and rankings, and marking the user identification according to the marking instruction.

13. The non-transitory computer storage medium according to claim 11, the processor executable instruction being executed by a processor for performing:

receiving user-defined marker information that is entered by a user; and marking the user identification according to the user-defined marker information.

14. The non-transitory computer storage medium according to claim 11, the processor executable instruction being executed by a processor for performing:

sending marker information about the user identification to the server.

* * * * *